(12) United States Patent
Kim et al.

(10) Patent No.: US 8,446,559 B2
(45) Date of Patent: May 21, 2013

(54) STEREOSCOPIC DISPLAY DEVICE, METHOD OF FABRICATING THE SAME, AND BONDING APPARATUS USED TO FABRICATE THE SAME

(75) Inventors: Kyeong Jin Kim, Daegu (KR); Su Dong Roh, Gyeonggi-Do (KR); Jae Hyun Soh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/445,686

(22) Filed: Apr. 12, 2012

(65) Prior Publication Data

US 2012/0222797 A1    Sep. 6, 2012

Related U.S. Application Data

(62) Division of application No. 11/825,007, filed on Jul. 3, 2007, now Pat. No. 8,174,632.

(30) Foreign Application Priority Data

Oct. 13, 2006    (KR) ............................... 2006-099998

(51) Int. Cl.
    *G02F 1/13*    (2006.01)
(52) U.S. Cl.
    USPC ................. 349/187; 349/15; 349/190; 438/30
(58) Field of Classification Search
    USPC ................................. 349/15, 187, 190; 438/30
    See application file for complete search history.

(56) References Cited

U.S. PATENT DOCUMENTS

| | | | |
|---|---|---|---|
| 3,958,882 | A | 5/1976 | Gast |
| 3,977,786 | A | 8/1976 | Gast |
| 4,596,458 | A | 6/1986 | Gundlach |
| 4,772,943 | A | 9/1988 | Nakagawa et al. |
| 5,052,783 | A | 10/1991 | Hamada |
| 5,402,191 | A | 3/1995 | Dean et al. |
| 5,465,175 | A | 11/1995 | Woodgate et al. |
| 5,467,205 | A | 11/1995 | Kuba et al. |

(Continued)

FOREIGN PATENT DOCUMENTS

| | | |
|---|---|---|
| JP | 2000-187230 | 7/2000 |
| KR | 1020060060471 | 6/2006 |
| WO | WO9719964 | 6/1997 |

OTHER PUBLICATIONS

Office Action issued in corresponding Korean Patent Application No. 10-2006-0099998, mailed Sep. 24, 2012.

*Primary Examiner* — Mark Robinson
*Assistant Examiner* — Peter Radkowski
(74) *Attorney, Agent, or Firm* — Brinks Hofer Gilson & Lione (57) ABSTRACT

A method of forming a stereoscopic liquid crystal display comprises providing an LCD panel, the LCD panel having a display area and a non-display area; disposing a lenticular plate on the LCD panel wherein a space is defined between a surface of the LCD panel and a surface of the lenticular plate; forming a seal between the surface of the LCD panel and the surface of the lenticular plate, the seal formed around the perimeter of the display area; forming a hole in the lenticular plate, the hole providing an air conduit that communicates with the space between the surface of the LCD panel and the surface of the lenticular plate; evacuating air from between the space; and filling the hole with a finishing material to maintain the vacuum between the lenticular plate and the LCD panel.

15 Claims, 10 Drawing Sheets

U.S. PATENT DOCUMENTS

| | | |
|---|---|---|
| 5,552,840 A | 9/1996 | Ishii et al. |
| 5,629,798 A | 5/1997 | Gaudreau |
| 5,640,273 A | 6/1997 | Hamagishi et al. |
| 5,649,897 A | 7/1997 | Nakamura et al. |
| 5,956,001 A * | 9/1999 | Sumida et al. .................. 345/55 |
| 6,020,941 A | 2/2000 | Ma |
| 6,191,881 B1 | 2/2001 | Tajima |
| 6,278,501 B1 | 8/2001 | Lin |
| 6,381,072 B1 | 4/2002 | Burger |
| 6,384,980 B1 | 5/2002 | McKinley |
| 6,437,764 B1 | 8/2002 | Suzuki et al. |
| 6,445,406 B1 | 9/2002 | Taniguchi et al. |
| 6,590,605 B1 | 7/2003 | Eichenlaub |
| 6,621,543 B2 | 9/2003 | Moon |
| 6,624,947 B2 | 9/2003 | McKinley |
| 6,647,763 B1 | 11/2003 | Smith |
| 6,703,989 B1 | 3/2004 | Harrold et al. |
| 6,736,515 B2 | 5/2004 | Hara |
| 6,771,231 B2 | 8/2004 | Ishikawa |
| 6,818,889 B1 | 11/2004 | Sheehan et al. |
| 6,825,985 B2 | 11/2004 | Brown et al. |
| 6,859,240 B1 | 2/2005 | Brown et al. |
| 6,906,686 B2 | 6/2005 | Ishikawa |
| 7,058,252 B2 | 6/2006 | Woodgate et al. |
| 7,106,274 B2 | 9/2006 | Nishihara et al. |
| 7,109,962 B2 | 9/2006 | Takeuchi et al. |
| 7,191,338 B2 | 3/2007 | Stern et al. |
| 7,221,332 B2 | 5/2007 | Miller et al. |
| 7,253,791 B2 | 8/2007 | Kahan et al. |
| 7,272,275 B2 | 9/2007 | Spoonhower et al. |
| 7,317,494 B2 | 1/2008 | Mashitani et al. |
| 7,405,385 B2 | 7/2008 | Jiang et al. |
| RE40,706 E | 5/2009 | Mishima et al. |
| 7,557,337 B2 | 7/2009 | Jiang et al. |
| 2002/0163732 A1 | 11/2002 | McKinley |
| 2002/1063732 | 11/2002 | McKinley |
| 2003/0021034 A1 | 1/2003 | Yoshikawa et al. |
| 2004/0139635 A1 | 7/2004 | McKinley |
| 2005/0061950 A1 | 3/2005 | Jiang et al. |
| 2005/0133804 A1 | 6/2005 | Hsu et al. |
| 2006/0033010 A1 | 2/2006 | Jiang et al. |
| 2006/0038112 A1 | 2/2006 | Jiang et al. |
| 2007/0002451 A1 | 1/2007 | Summerlin |
| 2007/0035049 A1 | 2/2007 | Bruce et al. |

* cited by examiner

STEREOSCOPIC DISPLAY DEVICE, METHOD OF FABRICATING THE SAME, AND BONDING APPARATUS USED TO FABRICATE THE SAME

The present patent document is a divisional of U.S. patent application Ser. No. 11/825,007, filed Jul. 3, 2007, now U.S. Pat. No. 8,174,632 which claims priority to Korean Patent Application No. P2006-099998 filed in Korea on Oct. 13, 2006, which are hereby incorporated by reference.

BACKGROUND

1. Field of the Invention

Embodiments of the present invention relate to a liquid crystal display (LCD) device, and more particularly, to a stereoscopic LCD device in which an LCD panel or a lenticular plate does not sag or bend due to a vacuum between an LCD panel and a lenticular plate. The invention also relates to a method of fabricating the stereoscopic LCD device, and a bonding apparatus used to fabricate the stereoscopic LCD device.

2. Discussion of the Related Art

Various services have been developed for a high-speed information communication based on an ultra high-speed information networks. These services range from simple methods [hear-speak] to complex multi-media methods [hear-watch-speak] using a digital terminal, which transmits documents, sounds and images. It is envisioned that information communication will routinely use a three-dimensional based service, which allows a user to observe a realistic stereoscopic image.

Generally, the three-dimensional stereoscopic images are obtained based on a stereoscopic view by two eyes. Human eyes perceive views of the world from two different perspectives due to their spatial separation. The spatial separation between the eyes of a typical individual is about 65 mm. Due to the spatial separation between the left and right eyes, slightly different views are perceived, which is referred to as binocular disparity. The three-dimensional stereoscopic image display device uses the binocular disparity effect where the left eye perceives only the left-side view and the right eye perceives only the right-side view.

The left and right eyes perceive two different two-dimensional images, and the two images are transmitted to the human brain by the retina. The human brain then integrates the two images so as to reproduce the realistic and stereoscopic three-dimensional image, which is referred to as a stereography.

The technology of expressing the above-mentioned three-dimensional stereoscopic images can be classified into a stereoscopic display method, a volume measurement method and a hologram method. Furthermore, the stereoscopic display method is divided into a 3-D glass method and an auto-stereoscopic method based on whether special eyeglasses are adopted. The auto-stereoscopic method is further divided into a parallax barrier type and a lenticular type, on the basis of the structural shape used to realize the 3D stereoscopic image. Hereinafter, the lenticular type stereoscopic display method and apparatus will be explained.

Figure 1:
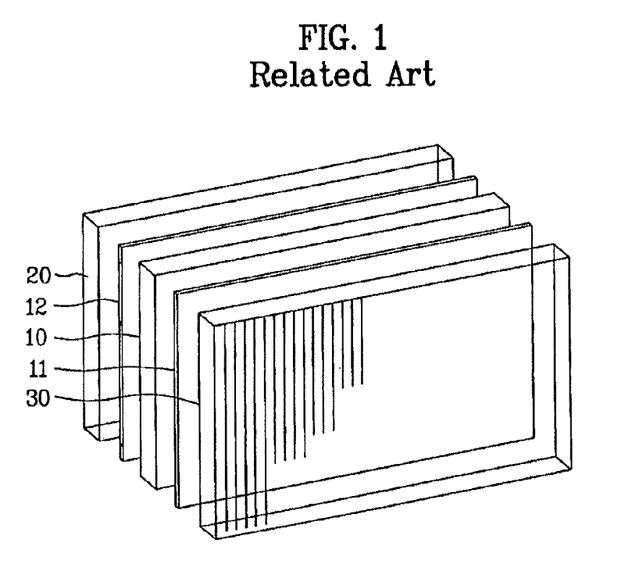
FIG. 1 is a perspective view of a related art lenticular-type stereoscopic liquid crystal display device.
Figure 2:
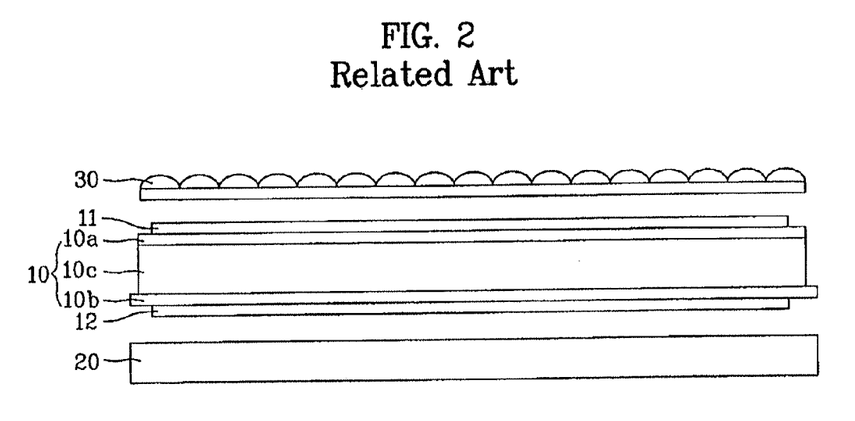
FIG. 2 is a cross sectional view of FIG. 1.

FIG. 1 is a perspective view of a related art stereoscopic liquid crystal display device of the lenticular type. FIG. 2 is a cross sectional view of FIG. 1. As shown in FIG. 1, the related art stereoscopic liquid crystal display device includes an LCD panel 10 having lower and upper substrates 10a and 10b, a liquid crystal 10c material disposed between the lower and upper substrates 10a and 10b, and a backlight unit 20 to emit light to the LCD panel 10. The backlight unit 20 is positioned at the rear surface of LCD panel 10. A lenticular plate 30 is formed on the front surface of LCD panel 10 to develop the stereoscopic image.

Referring to FIG. 2, first and second polarizing sheets 11 and 12 are adhered to the upper surface of upper substrate 10a and the lower surface of lower substrate 10b, respectively. The lenticular plate 30 is formed by providing an embossing-pattern material layer on a flat substrate. As the image passes through the LCD panel 10 and the lenticular plate 30, different image groups are perceived by the left and right eyes of the observer to facilitate perception of a stereoscopic image.

For the related art stereoscopic liquid crystal display device, the lenticular plate 30 and the LCD panel 10 are supported by an apparatus (not shown). That is, the lenticular plate 30 is provided at a predetermined distance from the first polarizing sheet 11 of LCD panel 10 with a spacing component therebetween configured to maintain the predetermined distance between the lenticular plate 30 and the first polarizing sheet of LCD panel. It is necessary for the LCD panel 10, including the polarizing sheet, to remain flat. To accomplish this, the lenticular plate and the LCD panel are mechanically fixed or adhered to each other.

In this case, the LCD panel 10 or lenticular plate 30 may sag or bend toward the first polarizing sheet 11 of LCD panel 10. If the LCD panel 10 or lenticular plate 30 sags or bends, an abnormal light passage condition occurs from the backlight unit 20, through the LCD panel 10 and the lenticular plate 30, thereby deteriorating the picture quality. This is especially true in the case of a large-sized LCD panel, where the LCD panel or lenticular plate may severely sag or bend due to its own weight, whereby the picture quality may be reduced by crosstalk.

To decrease the space between the LCD panel 10 and the lenticular plate 30, the LCD panel 10 and the lenticular plate 30 are fixed to each other by an adhesive. In the case of large screens, a large amount of adhesive is used, and transmittance of light is lowered due to the adhesive.

BRIEF SUMMARY

A stereoscopic display is disclosed that comprises a flat panel display having a display area and a non-display area and a lenticular plate disposed above the flat panel display. A space is defined between a surface of the flat display panel and a surface of the lenticular plate. A sealant material is disposed in a predetermined pattern between the surface of the flat panel display and the surface of the lenticular plate. An evacuation hole is formed in the lenticular plate providing an air conduit that communicates with the space between the surface of the flat panel display and the surface of the lenticular plate. A vacuum is formed in the space between the surface of the flat panel display, the surface of the lenticular plate and the sealant material. The hole is sealed with a finishing material to maintain the vacuum in the space between the flat panel display and the lenticular plate. The stereoscopic display maybe a liquid crystal display.

In another aspect, a method of forming a stereoscopic display, such as a liquid crystal display, is disclosed. A flat panel display is provided. The flat panel display has a display area and a non-display area. A lenticular plate is disposed on the flat panel display. A space is defined between a surface of the flat panel display and a surface of the lenticular plate. A seal is formed between the surface of the flat panel display and the surface of the lenticular plate. The seal is formed in a predetermined pattern around the perimeter of the display area. A hole is formed in the lenticular plate. The hole provides an air conduit that communicates with the space between the surface of the flat panel display and the surface of the lenticular plate. Air is evacuated from the space between the surface of the flat panel display and the surface of the lenticular plate. The hole is filled with a finishing material to maintain the vacuum between the lenticular plate and the flat panel display.

In another aspect, a bonding apparatus is disclosed for bonding a lenticular plate having an evacuation hole and an LCD panel to each other. The LCD panel includes a display area and a non-display area. A sealant is formed in the non-display area between the LCD panel and the lenticular plate. The apparatus comprises a bonding part to bond the lenticular plate and the LCD panel to each other by interposing the sealant therebetween. A pipe is connected to the evacuation hole. A vacuum pump is provided to pump the air evacuated through the pipe. A vacuum tank stores the air supplied through the pipe, and externally discharges the stored air through an outlet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to exemplary embodiments, which are illustrated in the accompanying drawings. Wherever possible, the same reference numbers will be used throughout the drawings to refer to the same or like parts. A stereoscopic liquid crystal display device, a method of fabricating the display device, and a bonding apparatus used to fabricate the display device, will be described with reference to the accompanying drawings.

Figure 3:
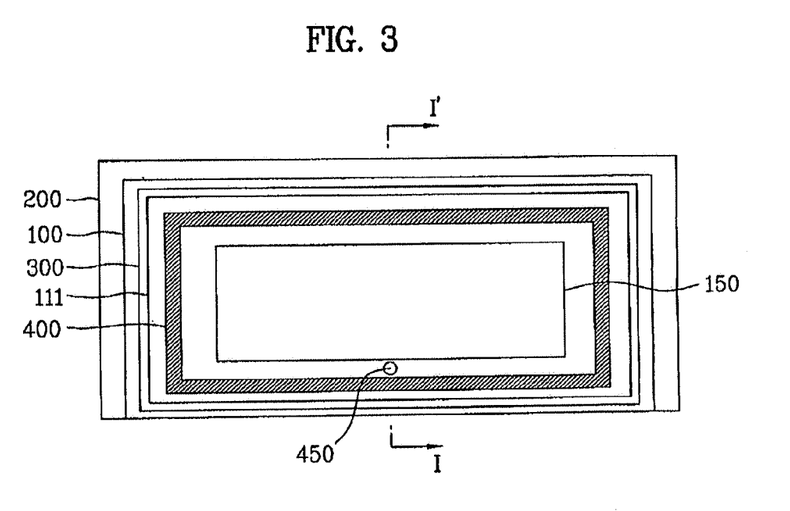
FIG. 3 is a plan view of a stereoscopic liquid crystal display device according to an embodiment.
Figure 4:
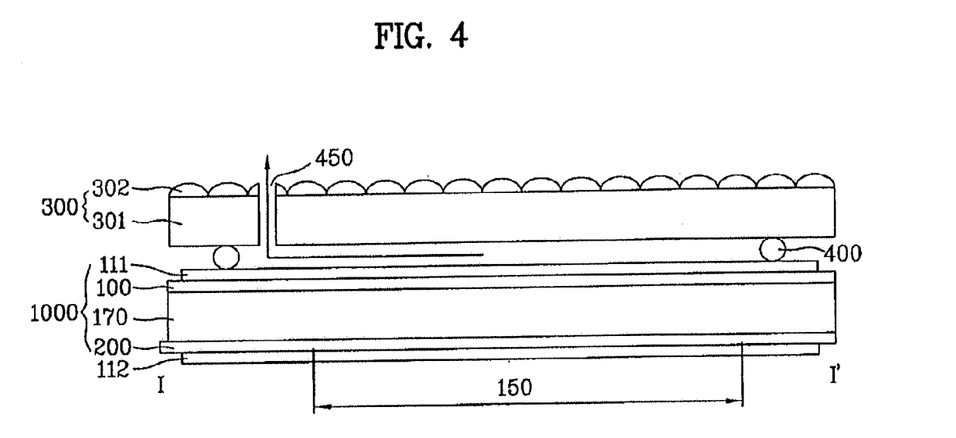
FIG. 4 is a cross sectional view taken along line I-I' of FIG. 3.

FIG. 3 is a plan view illustrating a stereoscopic liquid crystal display device. FIG. 4 is a cross sectional view taken along line I-I' of FIG. 3. As shown in FIGS. 3 and 4, the stereoscopic liquid crystal display device includes an LCD panel 1000 defining a display area 150 and a non-display area (the outside of the display area 150), a lenticular plate 300 positioned above the LCD panel 1000, and a sealant 400 formed in the non-display area between the LCD panel 1000 and the lenticular plate 300. Also included is an aperture or evacuation hole 450 formed in the lenticular plate 300 between the sealant 400 and the boundary of display area 150, a finishing material (see 600 of FIG. 11) configured to fill the evacuation hole 450, and an optical apparatus (not shown) positioned below the LCD panel 1000. The evacuation hole 450 provides an air conduit that communicates between the surfaces of the LCD panel and the lenticular plate.

The LCD panel 1000 includes a first substrate 100, and a second substrate 200 facing the first substrate. A sealing pattern (not shown) is formed along the perimeter of display area between the first and second substrates 100 and 200, and a layer of liquid crystal material 170 fills the space between the first and second substrates 100 and 200. In addition, there are first and second polarizing sheets 111 and 112 adhered to at least the display area 150 of the lower and upper surfaces of the LCD panel 1000, respectively. Also, the sealant 400 may be formed on the upper surface of the first polarizing sheet 111, or may be formed on the lower surface of the lenticular plate 300.

The lenticular plate 300 is formed of a glass substrate 301, and a polymer 302 with an embossing pattern is provided on the glass substrate 301. Although not shown, the lenticular plate 300 may alternatively be formed only of the polymer 302, and without the glass substrate 301. In this case, the polymer has a predetermined thickness and is formed such that the lower part of the polymer is flat, and the upper part of the polymer is embossed or patterned.

An evacuation hole 450 is formed through a portion of the lenticular plate 300 using a laser at a location inward of the sealant in the non-display area. The size of evacuation hole 450 is determined based on the distance between the LCD panel 1000 and the lenticular plate 300 when the LCD panel 1000 and the lenticular plate 300 are bonded to each other. The finishing material 600 used to fill the evacuation hole 450 may be formed of the same material as that of the sealant 400, the polymer 302 or the glass substrate 301. The sealant 400 is provided at fixed intervals along the four sides of the lenticular plate 300, wherein the sealant 400 is formed along a rectangular area, which is smaller than the lenticular plate 300. The sealant 400 forms a closed-loop. The sealant 400 is preferably formed of a UV curable material. After bonding the lenticular plate 300 to the LCD panel 1000, the sealant 400 is cured by UV light.

Once the LCD panel 1000 and the lenticular plate 300 have been bonded, the evacuation hole 450 is connected with a vacuum jig provided in a bonding apparatus. Air is evacuated from the space between the LCD panel 1000 and the lenticular plate 300 through the evacuation hole 450. After the air has been evacuated, the evacuation hole 450 is filled with the finishing material. As a result, a stable vacuum is maintained between the lenticular plate 300 and the LCD panel 1000.

Through the air evacuation process, the LCD panel 1000 and the lenticular plate 300 may be completely bonded to each other without the small gap, or may be bonded with the minute gap. In any case, the gap provided between the LCD panel 1000 and the lenticular plate 300 is smaller than the initial gap provided prior to the evacuation of the air. As a result, after fabricating the stereoscopic liquid crystal display device, it is possible to prevent the LCD panel 1000 or lenticular plate 300 from sagging or bending due to bonding and/or evacuation of air.

Figure 5:
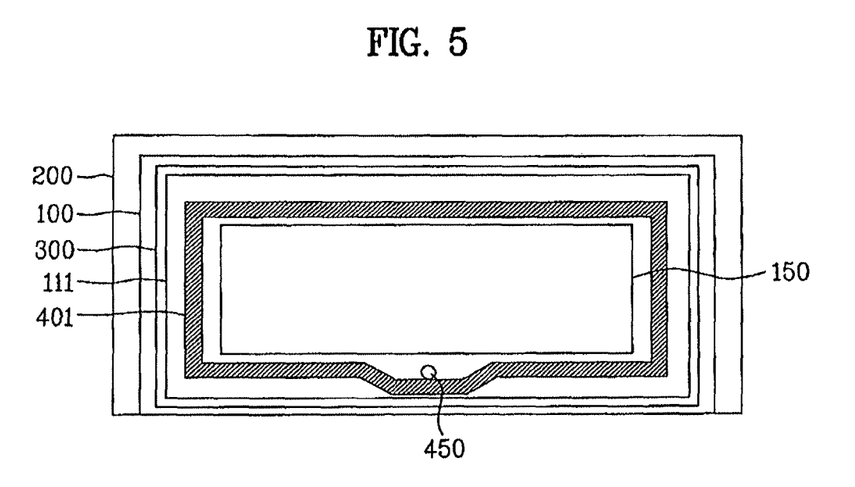
FIG. 5 is a plan view of a stereoscopic liquid crystal display device according to an embodiment.

FIG. 5 is a plan view of illustrating a stereoscopic liquid crystal display device according to a second embodiment. The stereoscopic liquid crystal display device is similar in structure to the prior embodiment except for the inclusion of a sealant 401 provided adjacent to the perimeter of the lenticular plate 300 formed near evacuation hole 450, as shown in FIG. 5.

A predetermined portion of the sealant 401 corresponding to the location of the evacuation hole 450 extends outwardly toward an peripheral edge of lenticular plate 300. The extended portion is formed because there may not be sufficient space to form the evacuation hole 450 between the sealant 400 and a display area 150 in the first embodiment.

Alternatively, the evacuation hole 450 may be formed in the sealant 400 or 401. In this case, there is no laser-irradiation process for forming the evacuation hole. The sealant material is provided except at the portion used to form the evacuation hole. Thus, the sealant may be formed as a thin line of material with a discontinuity or a small portion missing. The vacuum jig then is positioned in the portion where no sealant material exists so as to evacuate the air from between the lenticular plate 300 and the LCD panel 1000 to bond the lenticular plate 300 to the LCD panel 1000. The finishing material then fills the evacuation hole in a similar way as described with respect to the first and second embodiments. Accordingly, the sealant includes a first pattern formed in the portions except at the location of the evacuation hole. A second pattern is formed only in area of the evacuation hole, where the first pattern is connected with the second pattern.

Figure 6A:
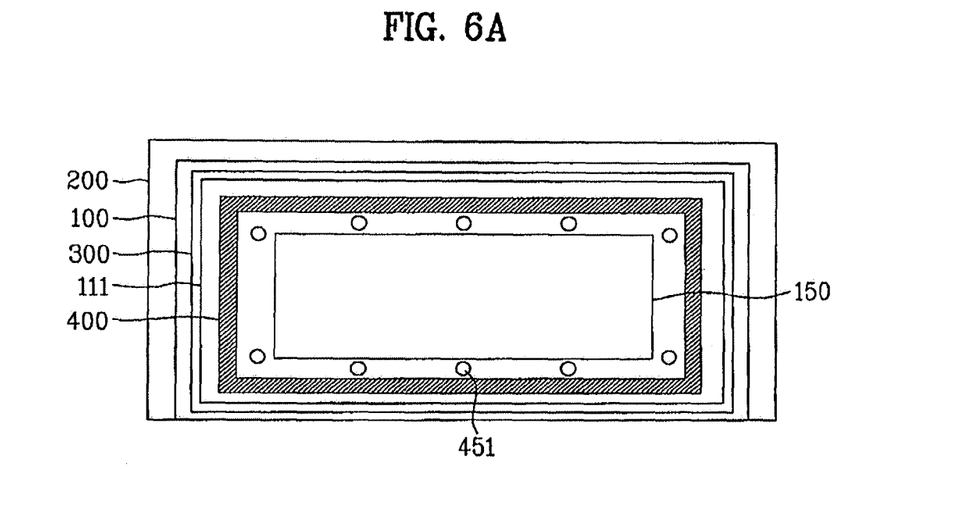
FIGS. 6A and 6B are plan views of a stereoscopic liquid crystal display device according to an embodiment.
Figure 6B:
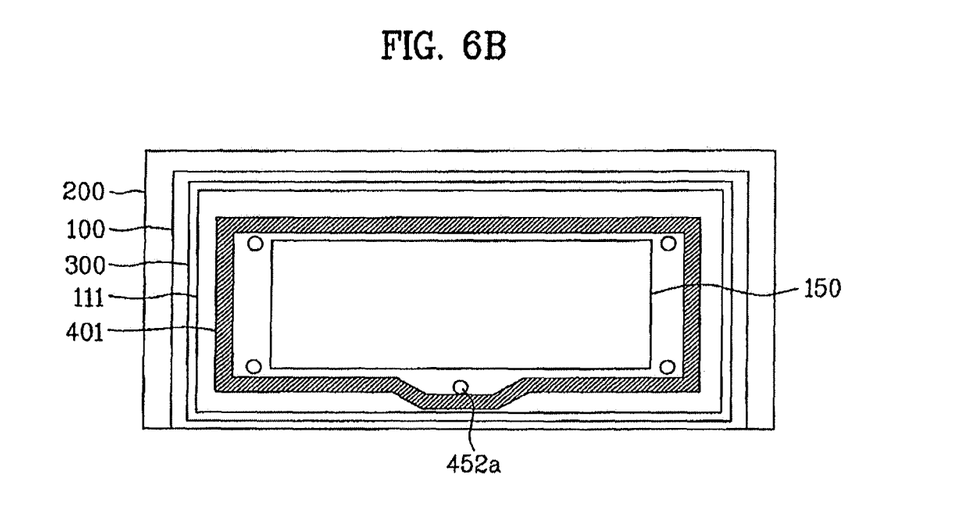

FIGS. 6A and 6B are plan views of a stereoscopic liquid crystal display device according to third and fourth embodiments. The stereoscopic liquid crystal display devices are similar in structure to the devices described previously, and include a plurality of evacuation holes 451 and 452a.

The size and number of evacuation holes 451 and 452a are determined based on a distance or gap between an LCD panel 1000 and a lenticular plate 300. As the number of evacuations holes 451 and 452a increases, the speed of evacuating air from between the LCD panel 1000 and the lenticular plate 300 also increases.

Figure 7:
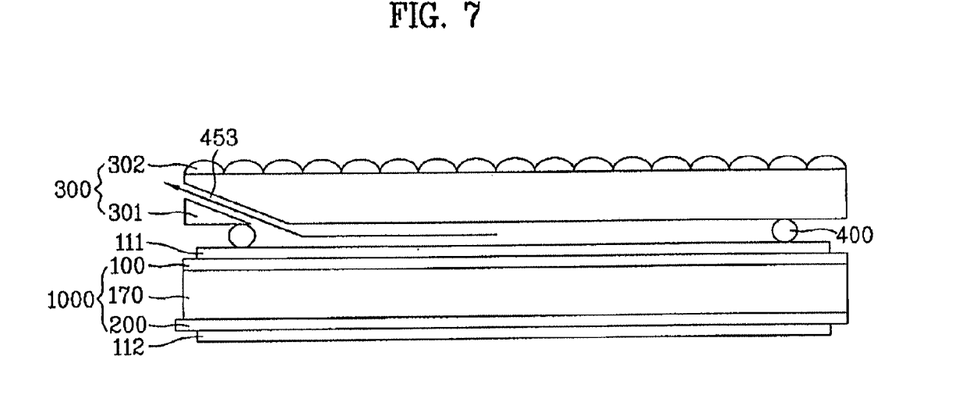
FIG. 7 is a cross sectional view of a stereoscopic liquid crystal display device according to an embodiment.

FIG. 7 is a cross sectional view of a stereoscopic liquid crystal display device according to a fifth embodiment. An evacuation hole 453 is formed at an angle from a lower face of the lenticular plate 300 to an upper face of the lenticular plate 300. In the previous embodiments described, the evacuation holes 450, 451 and 452a may also be formed at an angle.

Figure 8:
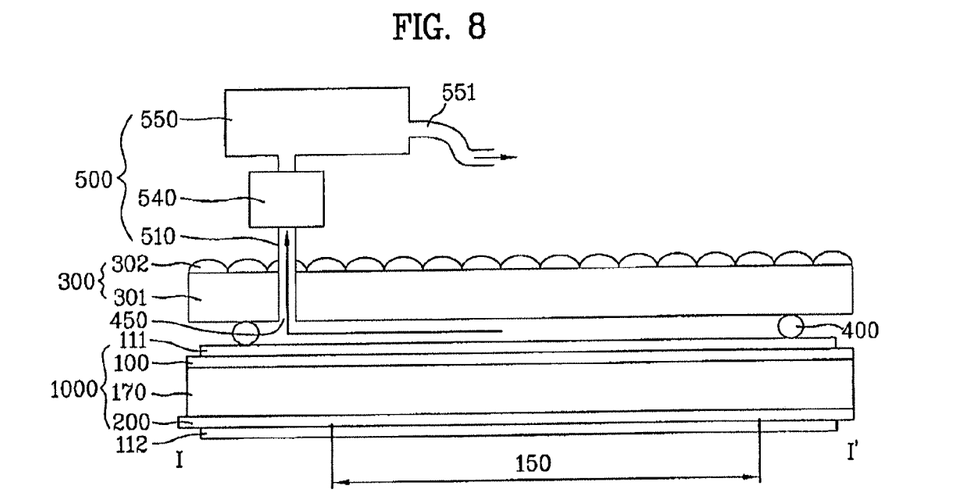
FIG. 8 is a pictorial view of a bonding apparatus for fabricating a stereoscopic liquid crystal display device according to an embodiment.

FIG. 8 is a pictorial view of a bonding apparatus used to fabricate the stereoscopic liquid crystal display device. The bonding apparatus includes a bonding part (not shown) to bond the lenticular plate 300 and the LCD panel 1000 to each other with sealant 400. The bonding apparatus also includes a pipe 510 connected to the evacuation hole 450, a vacuum pump 540 to pump the air evacuated through the pipe 510, and a vacuum tank 550 to store the air supplied through the pipe 540 so as to discharge the air to the external environment through an outlet.

The pipe 510, the vacuum pump 540 and the vacuum tank 550 constitute the vacuum jig. Alternatively, instead of providing a separate vacuum jig, the vacuum jig may be included in the bonding apparatus. Also, the pipe 510 of vacuum jig is connected to the evacuation hole 450 during the bonding process, and is separated from the evacuation hole 450 after the air is discharged from between the LCD panel 1000 and the lenticular plate 300.

Figure 9:
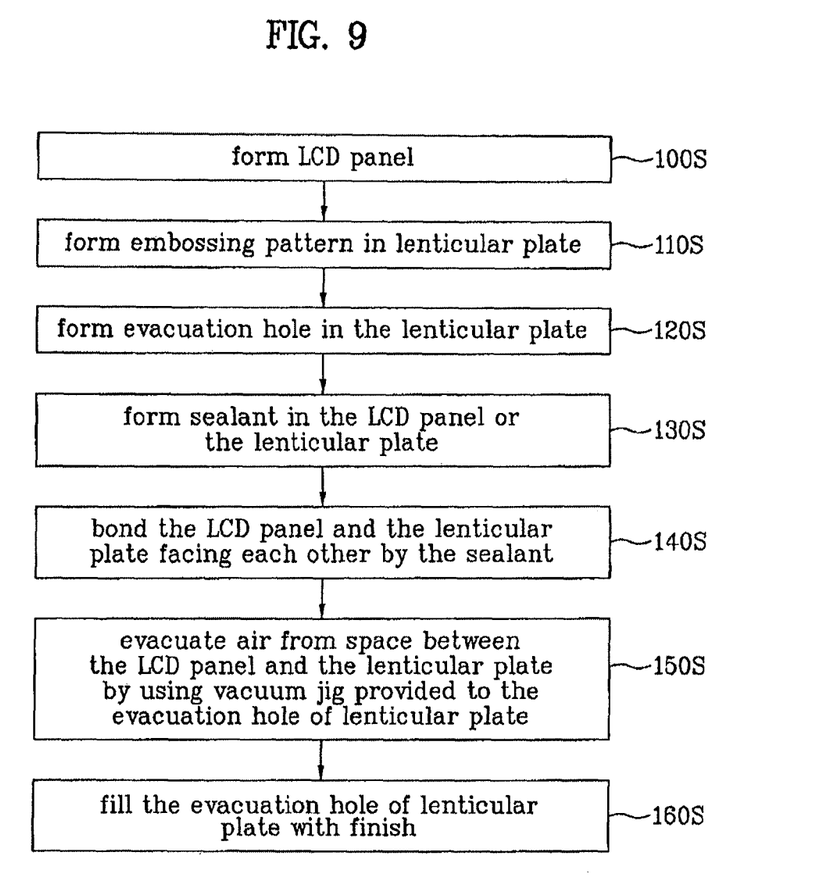
FIG. 9 is a flowchart illustrating a method of fabricating a stereoscopic liquid crystal display device according to an embodiment.

FIG. 9 is a flowchart illustrating a method of fabricating a stereoscopic liquid crystal display device. FIGS. 10A-10C and 10E-10G are cross sectional views, while FIG. 10D is a plan view, illustrating a method of fabricating a stereoscopic liquid crystal display device. The fabrication method of the stereoscopic liquid crystal display device is carried out in accordance with the flowchart of FIG. 9, and the fabrication process is explained with reference to FIGS. 10A to 10G.

Figure 10A:
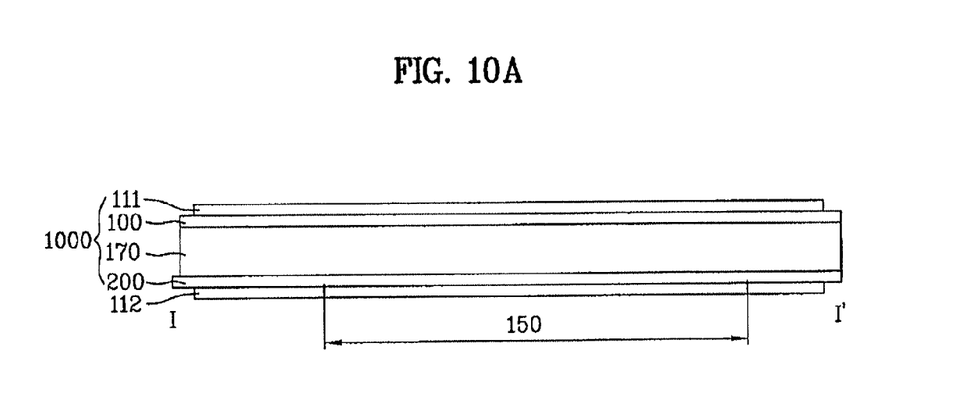
FIGS. 10A to 10G are cross sectional views illustrating a stereoscopic liquid crystal display device according to an embodiment.

As shown in FIG. 10A, the LCD panel 1000 including the display area 150 and the non-display area is formed (100S). The LCD panel 1000 includes the first substrate 100, and the second substrate 200 facing the first substrate. The seal pattern (not shown) is formed along a perimeter of display area between the first and second substrates 100 and 200. The liquid crystal layer 170 is injected between the first and second substrates 100 and 200 and sealed within by the seal. The LCD panel 1000 is formed in the region including at least display area 150. In addition, the first and second polarizing sheets 111 and 112 are adhered to the lower and upper surfaces of LCD panel 1000, respectively. The first and second polarizing sheets 111 and 112 may the same size as or larger than the display area 150. The first and second polarizing sheets 111 and 112 may be smaller than the lenticular plate 300 and the first and second substrates 100 and 200 of LCD panel 1000.

Figure 10B:
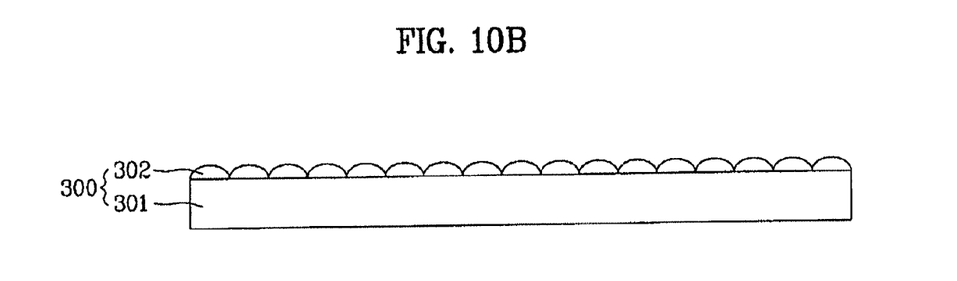

Referring to FIG. 10B, the lenticular plate 300 is formed. The lenticular plate 300 is larger than the display area 150, and is the same or smaller in size than the LCD panel 1000 (110S). The lenticular plate 300 is formed of the glass substrate 301 and the polymer 302 with the embossing pattern provided on the glass substrate 301. Although not shown, the lenticular plate 300 may be formed only with the polymer 302 and without the glass substrate 301. In this case, the polymer has a predetermined thickness and has a flat lower surface and an embossed upper surface. Alternatively, the polymer may be formed only by the embossing-pattern shape without forming the flat lower part.

Figure 10C:
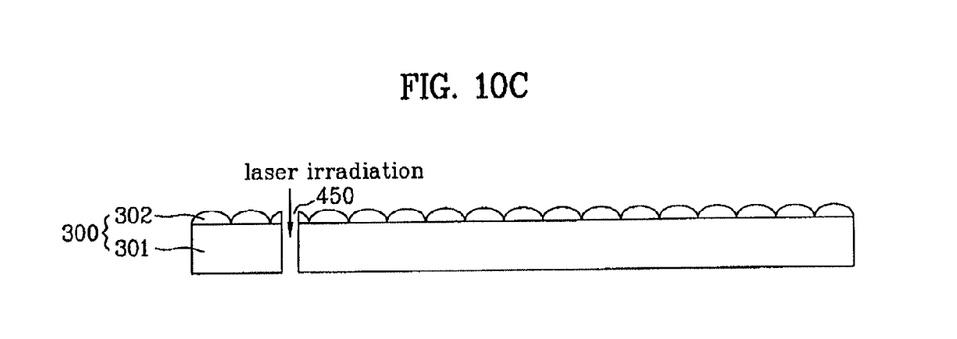
Figure 10D:
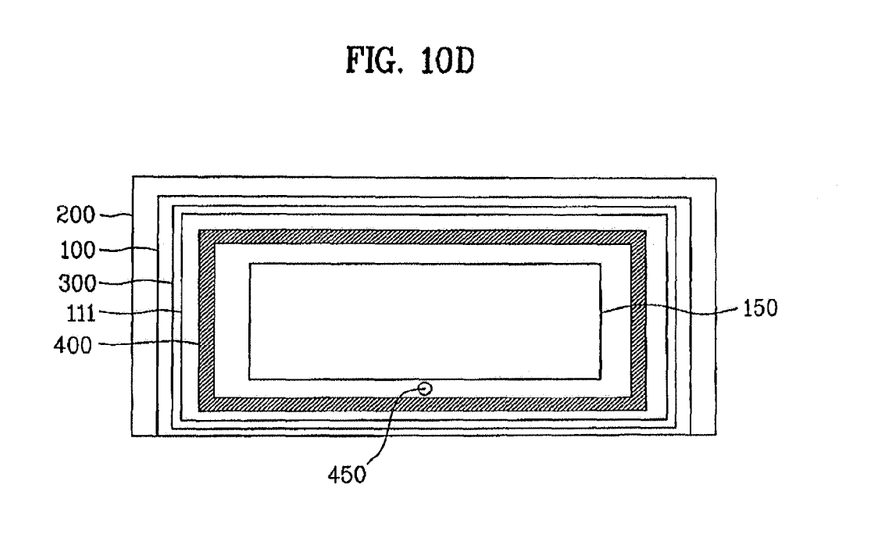

As shown in FIG. 100, a laser is applied to the predetermined portion of lenticular plate 300 near an edge of the display area to form the evacuation hole 450 (120S). There may be one or more evacuation holes 450. The size and number of evacuation holes 450 are determined based on the distance between the LCD panel 1000 and the lenticular plate 300. The laser may be applied perpendicular to the face of the lenticular plate 300, or may be applied at an angle, as illustrated for example in FIG. 7.

As shown in FIG. 10D, the sealant 400 is applied to surround the display area 150. The sealant 400 may be formed on either the LCD panel 1000 or the lenticular plate 300 (130S).

Figure 10E:
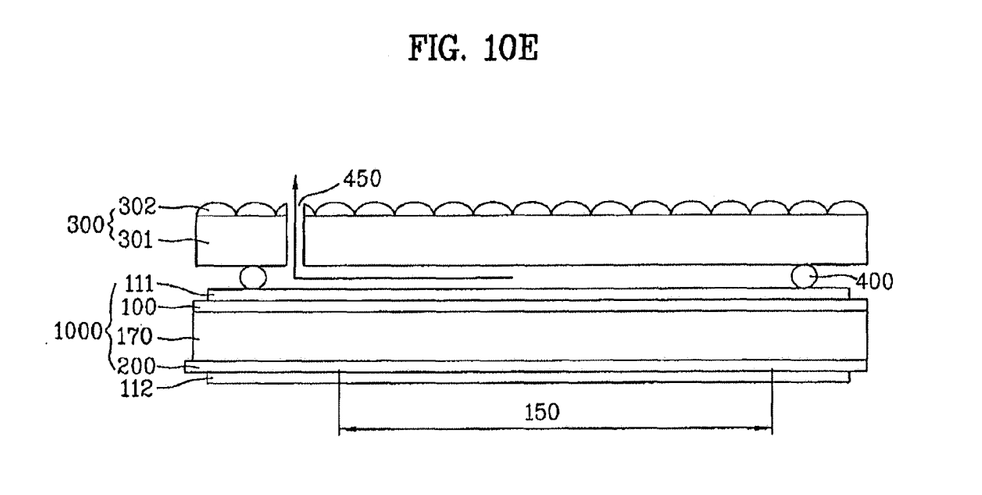

Referring to FIG. 10E, the LCD panel 1000 is bonded to the lenticular plate 300 by the sealant 400 (140S). Then, UV light is applied to the sealant 400 to cure the sealant 400. Ultraviolet light is used to cure the sealant 400 because heat-curing could deform the lenticular plate 300. The evacuation hole 450, shown in FIG. 10F, of the lenticular plate 300 meets with the vacuum jig provided in the bonding apparatus to evacuate the air from between the LCD panel 1000 and the lenticular plate 300 (150S).

Figure 10F:
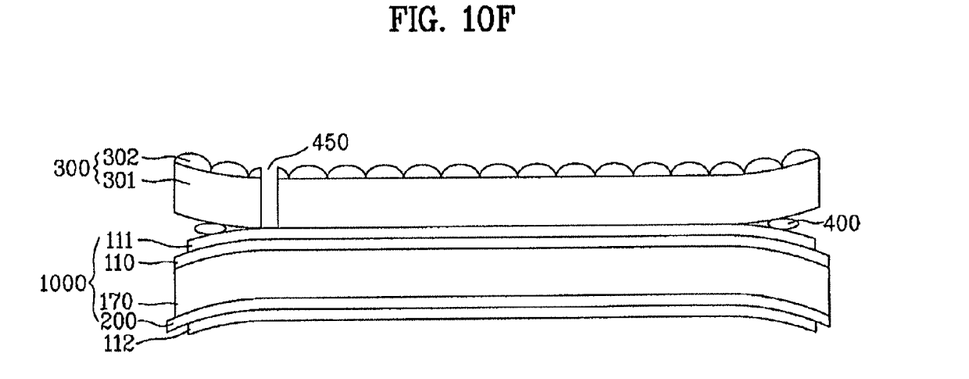

The vacuum jig includes the pipe 510, the vacuum pump 540 and the vacuum tank 550. The pipe 510 of vacuum jig is connected to the evacuation hole 450 in the process of bonding the LCD panel 1000 and the lenticular plate 300, and is removed from the evacuation hole 450 after the air is discharged from the space between the LCD panel 1000 and the lenticular plate 300.

Regarding the air evacuation process, the lenticular plate 300 and the LCD panel 1000 may be completely bonded to each other, or a minute gap may be maintained between the lenticular plate 300 and the LCD panel 1000. Even though a minute gap may be maintained between the LCD panel 1000 and the lenticular plate 300, the gap is relatively slight compared with the initial gap prior to the air evacuation process. As a result, after completing the stereoscopic liquid crystal display device, it is possible to prevent the LCD panel 1000 or lenticular plate 300 from sagging or bending.

By controlling the vacuum level during the air evacuation process, a minute gap may be maintained over the entire display area 150. In another aspect, when the LCD panel 1000 is completely bonded to the lenticular plate 300, the entire display area 150 is formed without the gap.

Figure 10G:
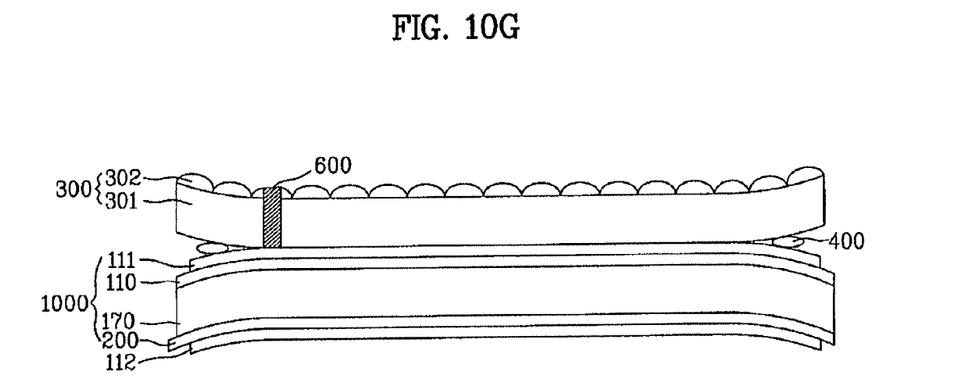

As shown in FIG. 10G, the evacuation hole 450 of lenticular plate 300 is filled with the finishing material 600. The finishing material 600 may be the same material as that of the sealant 400 or the lenticular plate 300.

Figure 11:
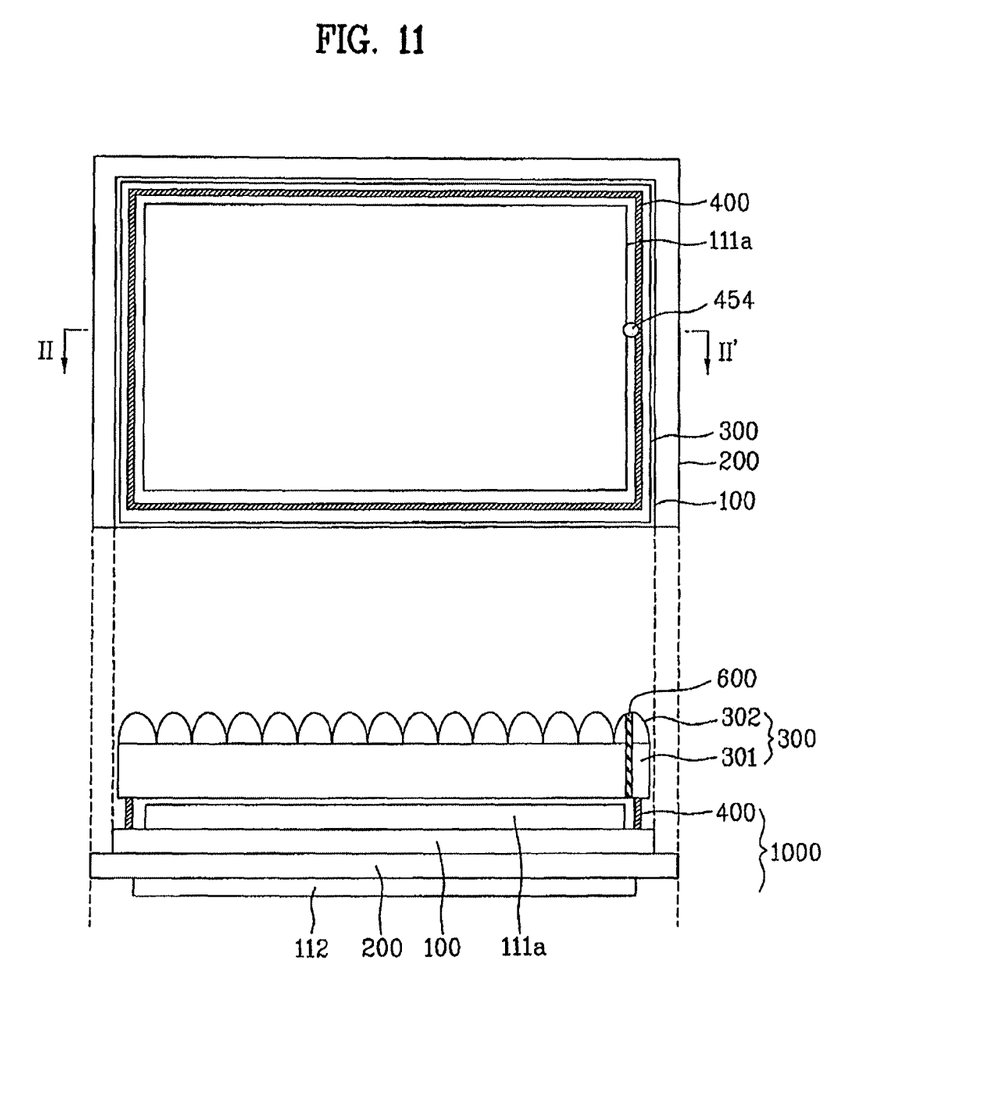
FIG. 11 is a plan view and a cross sectional view illustrating a liquid crystal panel and a lenticular plate in a stereoscopic liquid crystal display device according to an embodiment.

FIG. 11 is a plan view and a cross sectional view of a bonding method of a liquid crystal panel and a lenticular plate in a stereoscopic liquid crystal display device. The first to fifth embodiments described above show that the sealant 400 is formed between the upper surface of first polarizing sheet and the lower surface of lenticular plate 300.

Alternatively, as shown in FIG. 11, a sealant 400 is formed between the lenticular plate 300 and the first substrate 100 of LCD panel. It is possible to simplify an air-evacuation process due to a decreased gap between the lenticular plate 300 and a first polarizing sheet 111a.

The first polarizing sheet 111a is formed in a portion within the boundary of the sealant 400. That is, the sealant 400 is formed between the first substrate 100 and the lenticular plate 300, and the space between the lenticular plate 300 and the first polarizing sheet 111a is decreased in proportion to the thickness of first polarizing sheet 111a. Thus, the time required to evacuate the air is decreased. The first polarizing sheet 111a may be the same as or slightly larger than the display area 150.

After the air-evacuation process, the evacuation hole 454 is filled with the finishing material 600. The finishing material 600 may be formed of the same material as that of the sealant 400 or the lenticular plate 300. Because the evacuation hole 454 is formed in the non-display area, the finishing material 600 that fills the evacuation hole 454 has no effect on the light leakage. The finishing material 600 may be formed of a light-shielding material to prevent the reflection of light incident on the lateral side of lenticular plate 300.

There may be one or more evacuation holes 454. The size and number of evacuation holes are determined based on the gap between the lenticular plate 300 and the first polarizing sheet 111a of LCD panel 1000. As shown in the drawings, when the first polarizing sheet 111a is bonded to the lenticular plate 300, there may be a minute gap along the entire display area 150 between the first polarizing sheet 111a and the lenticular plate 300. In another aspect, the first polarizing sheet 111a of LCD panel 1000 may be completely bonded to the lenticular plate 300 so that there is no gap therebetween along the entire display area 150. The LCD panel 1000 according to the first to sixth embodiments may use an organic light-emitting diode (OLED), a plasma display panel (PDP) or other displays.

After the sealant material is formed on either the lenticular plate or the LCD panel, the evacuation hole is formed in the lenticular plate. A space between the lenticular plate and the LCD panel may be maintained under the vacuum state by the decompression apparatus.

Even though a large amount of adhesive ingredient is not used in the process of bonding the LCD panel and the lenticular plate, the entire display area is provided with the uniform gap, or no gap at all, between the LCD panel and the lenticular plate, thereby preventing the LCD panel or lenticular plate from sagging or bending.

Instead of providing the additional vacuum jig to evacuate the air through the evacuation hole in the air-evacuation process, the bonding apparatus used to bond the LCD panel and the lenticular plate may include the vacuum jig. This decreases the amount of time required to carry out the air-evacuation process The device and method disclosed above has been described with respect to an LCD flat panel display. The disclosed invention, however, may be used with other flat panel displays such as plasma displays, organic light emitting diode displays, etc.

It will be apparent to those skilled in the art that various modifications and variations can be made in the embodiments of the present invention without departing from the spirit or scope of the invention. Thus, it is intended that the present invention covers the modifications and variations of the embodiments provided they come within the scope of the appended claims and their equivalents.

The invention claimed is:

1. A method of forming a stereoscopic liquid crystal display comprising:
    providing an LCD panel including an upper substrate, a lower substrate disposed opposite the upper substrate, and liquid crystal material between the upper and lower substrate, the LCD panel having a display area and a non-display area;
    disposing a lenticular plate on the LCD panel wherein a space is defined between a surface of the LCD panel and a surface of the lenticular plate;
    forming a seal between the surface of the LCD panel and the surface of the lenticular plate, the seal formed in a predetermined pattern around the perimeter of the display area;
    forming a hole in the lenticular plate, the hole providing an air conduit that communicates with the space between the surface of the LCD panel and the surface of the lenticular plate;
    evacuating air from between the space; and
    filling the hole with a finishing material to maintain the vacuum between the lenticular plate and the LCD panel.

2. A method according to claim 1, wherein forming a seal comprises:
    providing an curable sealant material; and
    curing the curable sealant material to bond the lenticular plate and the LCD panel.

3. The method according to claim 2, comprising using an ultraviolet curable sealant material and irradiating the sealant material with ultraviolet light to cure the sealant material.

4. A method according to claim 1, wherein the hole is formed using a laser to form an aperture through the lenticular plate.

5. The method according to claim 1, comprising forming the hole through a thickness of the lenticular plate with the laser at an angle substantially perpendicular to a plane defined by the bottom surface of the lenticular plate.

6. The method according to claim 1, comprising forming the hole through a thickness of the lenticular plate with the laser at an angle relative to a plane defined by the surface of the lenticular plate.

7. The method according to claim 1, further comprising:
forming the lenticular plate from a glass substrate;
applying a polymer material over the glass substrate; and
embossing a pattern on an upper surface of the polymer material, the embossing pattern.

8. The method according to claim 1, wherein the vacuum substantially eliminates the gap between the lenticular plate and the LCD panel in the display area.

9. The method according to claim 1, comprising:
disposing the hole in the lenticular plate in the non-display area of the display; and
extending the predetermined pattern defined by the sealant outwardly toward an edge of the lenticular plate in an area of the hole so as to include the hole within the predetermined pattern.

10. The method according to claim 1, comprising forming a plurality of holes in the lenticular plate.

11. The method according to claim 1, further comprising forming a plurality of holes along a perimeter portion of the lenticular plate, the holes extending through a thickness of the lenticular plate.

12. The method according to claim 10, further comprising determining a diameter of the holes and the number of holes based on a distance between the lenticular plate and the LCD panel before the evacuation of air from the space between the lenticular plate and the LCD panel.

13. The method according to claim 1, wherein the sealant material is cured after air is evacuated to form the vacuum.

14. The method according to claim 1, wherein the sealant material is cured before the air is evacuated to form the vacuum.

15. A method of forming a stereoscopic display comprising:
providing a flat panel display having a display area and a non-display area;
disposing a lenticular plate on the flat panel display wherein a space is defined between a surface of the flat panel display and a surface of the lenticular plate;
forming a seal between the surface of the flat panel display and the surface of the lenticular plate, the seal formed in a predetermined pattern around the perimeter of the display area;
forming a hole in the lenticular plate, the hole providing an air conduit that communicates with the space between the surface of the flat panel display and the surface of the lenticular plate;
evacuating air from between the space; and
filling the hole with a finishing material to maintain the vacuum in the space between the lenticular plate and the flat panel display.

* * * * *